C. C. BROOKS.
Reversible Plow.
No. 224,136.  Patented Feb 3, 1880.
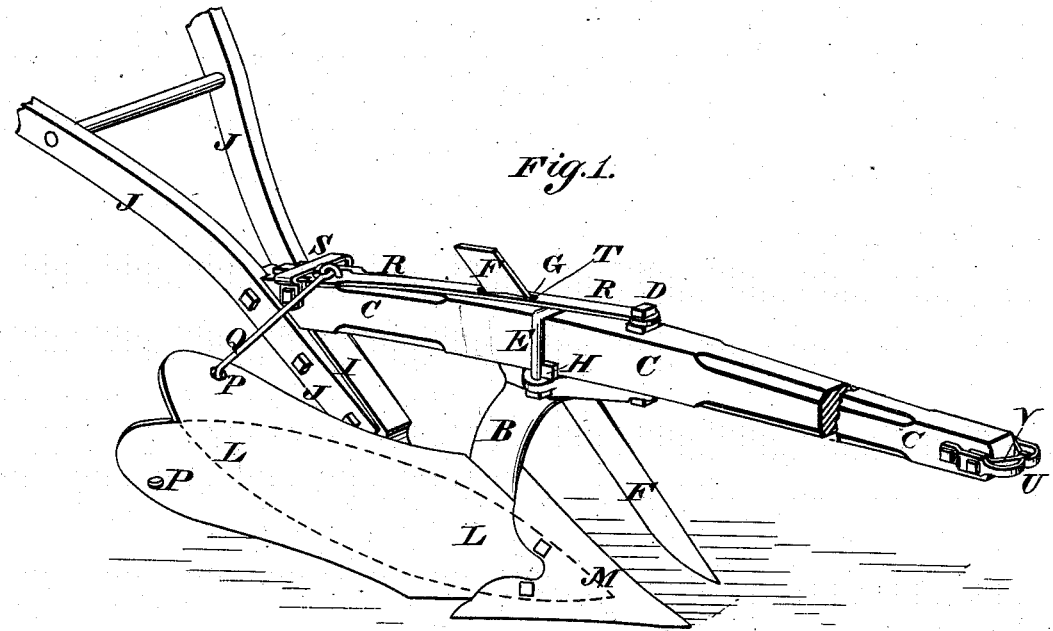
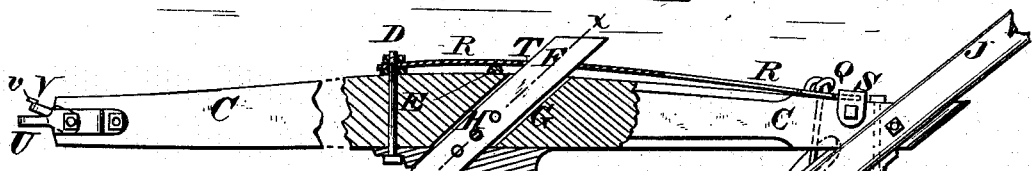
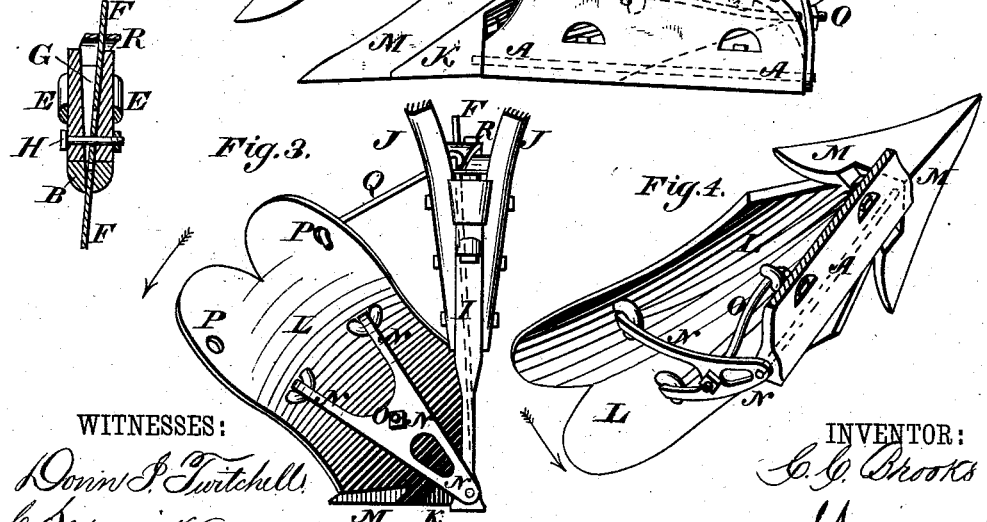
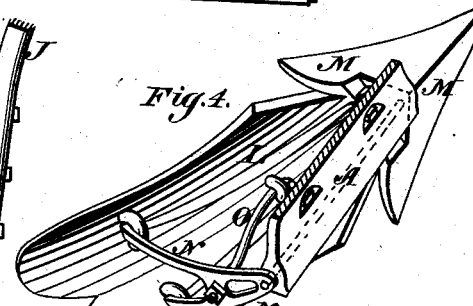
WITNESSES:
Donn P. Twitchell
C. Sedgwick
INVENTOR:
C. C. Brooks
BY Munn & Co.
ATTORNEYS.

UNITED STATES PATENT OFFICE.

CHAPIN C. BROOKS, OF LANCASTER, NEW HAMPSHIRE.

REVERSIBLE PLOW.

SPECIFICATION forming part of Letters Patent No. 224,136, dated February 3, 1880.

Application filed December 10, 1879.

*To all whom it may concern:*

Be it known that I, CHAPIN C. BROOKS, of Lancaster, in the county of Coos and State of New Hampshire, have invented a new and useful Improvement in Reversible Plows, of which the following is a specification.

Figure 1 is a perspective view of my improvement. Fig. 2 is a side elevation, partly in section. Fig. 3 is a rear view. Fig. 4 is a perspective view, showing the plow partly reversed. Fig. 5 is a sectional view taken through the line $x\ x$, Fig. 2. Fig. 6 is a plan view of the middle part of the lever.

Similar letters of reference indicate corresponding parts.

The object of this invention is to furnish reversible or side-hill plows so constructed as to turn a furrow in either direction upon level or hilly lands.

A represents the land-side of the plow. Upon the forward part of the land-side A is formed the forward standard, B, the upper end of which is secured to the beam C by the bolt D and by the staple-bolt E. The bolt E passes over the beam and through lugs upon the upper end of the standard B, and is secured in place by nuts screwed upon its ends. The bolt E also strengthens the beam against the strain of the cutter F, which passes through a mortise, G, formed through the beam C, in an inclined direction.

The cutter F is secured in place by a bolt, H, which passes through it and through the beam C. Several holes are formed in the cutter F to receive the bolt H, so that the said cutter F may be raised and lowered as required.

The mortise G is made of such a size at its lower end as to fit upon the cutter F, and flares gradually to its upper end, giving it a wedge form, as shown in Fig. 5, so that the cutter may be swung to one and the other side as the plow is reversed to bring it into proper position, the lower end of the mortise G serving as a fulcrum for the cutter F to turn upon.

Upon the rear part of the land-side A is formed the rear standard, I, the upper end of which is bolted to the rear end of the beam C. To the opposite sides of the rear standard, I, and of the rear end of the beam C are bolted the lower ends of the handles J. Against the forward end of the land-side A rests and to it is pivoted the base of a triangular block, K, formed upon or bolted to the forward end of the mold-board L. To the block K is also bolted the point M, which is made with a cutter upon each of its side edges.

To the rear end of the land-side A is pivoted the end of the triangular arm N, the branched end of which is attached to lugs upon the inner side of the rear part of the mold-board L. The arm N is further secured in place by a brace, O, the rear end of which is secured to the middle part of the said arm N, and its forward end is secured to a lug upon the inner side of the mold-board L. With this construction the mold-board L and point M can be readily turned from one to the other side of the land-side A.

The mold-board L is curved upon the arc of a circle along its central line. The forward middle part of the mold-board L is nearly flat transversely, and the said middle part becomes gradually convexed or rounded transversely toward its rear end. The said convexity increases toward the corners or wings of the rear end.

With this construction the plow will turn the furrow-slice with equal facility in either direction, and with the same facility upon level as upon inclined land. In the corners of the rear end of the mold-board L are formed holes P, to receive the hook Q, that holds the mold-board L in place when adjusted for work. The hook Q is hinged to the rear part of the lever R, so that it may be swung from one to the other side of the beam C as the mold-board L is reversed. The rear end of the lever R slides laterally in a keeper, S, attached to the plow-beam C, and its forward end is pivoted to the beam C by the bolt D.

In the lever R is formed a slot, T, to receive the projecting upper end of the cutter F, so that the said cutter may be adjusted by the movements of the lever R. The slot T is made wider at its ends and with its side edges rounded or convexed, as shown in Fig. 6, so that the lever R and cutter F will not bind upon each other, and so that the sides of the slot T may always bear against the sides of the cutter F, and thus assist in holding the said cutter in place when at work.

To the forward end of the plow-beam C is attached the clevis U, which is secured in place by two bolts passing through its arms and through the beam C. The middle part of the clevis U is bent inward to form two recesses, one adjacent to each arm, to receive the double-tree clevis, so that the point of draft attachment may be adjusted from one to the other of the said recesses as the plow is reversed.

V is an inner clevis, which is placed upon the beam C, within the clevis U, and has holes in its ends to receive the forward clevis-bolt, so that the forward part of the inner clevis, V, may be raised from the forward part of the outer clevis, U. The forward part of the clevis V is bent into V shape, and has a lip, v, formed upon its angle to rest upon the outer clevis, U, to prevent the said inner clevis from dropping through the said outer clevis.

With this construction, when the plow-beam C is turned to one side in reversing the plow, the pressure of the double-tree clevis will raise the inner clevis, V, so that the said double-tree clevis will pass from one to the other of the recesses of the clevis U, and will thus change the point of draft attachment automatically.

When a center draft is required both the clevises U V are passed through the double-tree clevis, so that the said double-tree clevis will rest in the recess of the inner clevis, V, and will thus be in the center line of the beam C.

Having thus described my invention, I claim as new and desire to secure by Letters Patent—

In reversible plows, the double clevis formed of the outer clevis, U, made with a recess near each arm, and the inner clevis, V, made with a recess in its center, substantially as herein shown and described, so that the point of draft attachment may be changed automatically as the plow is reversed, as set forth.

CHAPIN CHESMAN BROOKS.

Witnesses:
JAREW Q. WILLIAMS,
B. S. OLCOTT.